(12) United States Patent
Rees

(10) Patent No.: US 10,089,276 B1
(45) Date of Patent: Oct. 2, 2018

(54) DISTRIBUTED LOGIC CONTROL APPARATUS

(71) Applicant: EATON CORPORATION, Cleveland, OH (US)

(72) Inventor: Steven Dale Rees, Bothell, WA (US)

(73) Assignee: EATON INTELLIGENT POWER LIMITED, Dublin 4 (IE)

( * ) Notice: Subject to any disclaimer, the term of this patent is extended or adjusted under 35 U.S.C. 154(b) by 0 days.

(21) Appl. No.: 15/461,699

(22) Filed: Mar. 17, 2017

(51) Int. Cl.
 *G06F 13/42* (2006.01)
 *G06F 13/00* (2006.01)
 *G06F 13/40* (2006.01)
 *G06F 13/36* (2006.01)

(52) U.S. Cl.
 CPC .......... *G06F 13/4282* (2013.01); *G06F 13/36* (2013.01); *G06F 13/4086* (2013.01)

(58) Field of Classification Search
 None
 See application file for complete search history.

(56) References Cited

U.S. PATENT DOCUMENTS

| | | | |
|---|---|---|---|
| 6,233,626 B1 * | 5/2001 | Swales | G05B 19/4185 710/11 |
| 2008/0002737 A1 | 1/2008 | Schwenkel et al. | |
| 2016/0112518 A1 * | 4/2016 | Haleem | H04W 4/70 713/168 |

FOREIGN PATENT DOCUMENTS

| | | |
|---|---|---|
| EP | 1 936 457 A1 | 12/2006 |
| EP | 2109259 A1 | 10/2009 |
| EP | 3 076 606 A1 | 10/2016 |
| EP | 3 116 166 A1 | 1/2017 |

OTHER PUBLICATIONS

European Patent Office, "International Search Report and Written Opinion" from PCT/IB18/051193, dated Jun. 1, 2018, 11 pp.

* cited by examiner

*Primary Examiner* — Michael Sun
(74) *Attorney, Agent, or Firm* — Eckert Seamans

(57) ABSTRACT

A distributed logic control apparatus is usable to control a system and includes a plurality of enhanced intelligent devices and a network protocol control that are connected with a data network. The intelligent devices each have a processor apparatus and an algorithm operable thereon that enables each intelligent device to control a corresponding part of the system. Other algorithms on the intelligent devices provide an advantageous setup operation that enables the intelligent devices to cooperate with one another in a self-setup operation.

5 Claims, 5 Drawing Sheets

DISTRIBUTED LOGIC CONTROL APPARATUS

BACKGROUND

Field

The disclosed and claimed concept relates generally to a control apparatus usable to control a system and, more particularly, to a distributed logic control apparatus.

Related Art

As is generally understood in the relevant art, numerous types of control devices are usable to control systems. In systems wherein a large number of elements are separately in need of control, it has been known to employ a programmable logic controller (PLC) in order to enable the PLC to provide the control instructions to the various elements that are in need of control. In such a system, the various elements that are controlled may provide data signals to the PLC that are representative of the state, condition, status, etc. of the particular controlled element. In response to such data signals from the various controlled elements, the PLC may provide an instruction signal that is received by the controlled element and to which the controlled element responds by changing its state, condition, status, etc. While such control systems have been generally effective for their intended purposes, they have not been without limitation.

The PLC in such a system typically must be sufficiently robust to be capable of rapid data processing since the PLC typically is responsible for control of all of the controlled elements. This can cause the PLC to be costly. Moreover, such a system is not scalable because an increase in a number of controlled elements might necessitate the replacement of the existing PLC with one having a greater processing and control capability. Furthermore, such systems can be difficult to implement since the PLC is typically manually programmed in order to enable it to control the specific configuration of the control system, and any changes to the control system will necessitate further programming or editing of the logic that the PLC employs. Furthermore, the reliance upon the PLC to perform all of the control operations of the system is generally undesirable because it provides a single point of catastrophic failure, which is preferably avoided. Improvements thus would be desirable.

SUMMARY

An improved distributed logic control apparatus is usable to control a system and includes a plurality of enhanced intelligent devices and a network protocol control that are connected with a data network. The intelligent devices each have a processor apparatus and an algorithm operable thereon that enables each intelligent device to control a corresponding part of the system. Other algorithms on the intelligent devices provide an advantageous setup operation that enables the intelligent devices to cooperate with one another in a self-setup operation.

Accordingly, an aspect of the disclosed and claimed concept is to provide an improved distributed logic control apparatus that is usable with a system to provide distributed control of the system.

Another aspect of the disclosed and claimed concept is to provide an improved distributed logic control apparatus that includes a plurality of enhanced intelligent devices that are capable of implicit and/or explicit cross-signaling between one another to enable each such intelligent device to be aware of conditions around it and to employ the knowledge of such conditions in order to control its own portion of the system.

Another aspect of the disclosed and claimed concept is to provide a distributed logic control apparatus having a plurality of enhanced intelligent devices that are cooperable with one another to perform a self-setup operation whereby the distributed logic control apparatus sets itself up automatically.

Accordingly, an aspect of the disclosed and claimed concept is to provide an improved distributed logic control apparatus usable to control a system and which can be generally stated as including a data network, a plurality of devices connected with the data network, the plurality of devices can be generally stated as including a network protocol controller and a plurality of intelligent devices, the network protocol controller being structured to output to the data network a header of a data frame, each intelligent device of the plurality of intelligent devices can be generally stated as including a processor apparatus, the processor apparatus comprising a processor and a storage, the storage having stored therein a number of algorithms that are executable on the processor to cause the corresponding intelligent device to perform a number of operations, the plurality of intelligent devices each being structured to separately output a signal to the data network wherein the signals together form a data set of the data frame, and each intelligent device of the plurality of intelligent devices being structured to detect at least a portion of the data set, at least a first intelligent device of the plurality of intelligent devices being structured to perform an operation of the number of operations responsive to the detecting of the at least portion of the data set.

Another aspect of the disclosed and claimed concept is to provide an improved distributed logic control apparatus that can be generally stated as including a data network, a plurality of devices connected with the data network, the plurality of devices can be generally stated as including a network protocol controller and a plurality of intelligent devices, each intelligent device of the plurality of intelligent devices can be generally stated as including a processor apparatus, the processor apparatus can be generally stated as including a processor and a storage, the network protocol controller being structured to employ the data network to communicate to each intelligent device of the plurality of intelligent devices an address of the intelligent device, each intelligent device of the plurality of intelligent devices having stored in the storage a number of algorithms that include a setup algorithm, the setup algorithm being executable on the processor of the intelligent device to cause the intelligent device to perform a number of operations that can be generally stated as including querying at least one other device of the plurality of devices, responsive to the querying, making a determination that the at least one other device is one of another intelligent device of the plurality of intelligent devices and the network protocol controller, responsive to the determination being that the at least one other device is another intelligent device of the plurality of intelligent devices, assigning to the intelligent device a status of being a receiver from among a number of receivers, responsive to the determination being that the at least one other device is the network protocol controller, assigning to the intelligent device a status of being a generator, responsive to the intelligent device being the generator, communicating from the generator to each receiver from among the number of receivers a set of map data that comprises data representative of at least a subset of the plurality of devices, and responsive to the intelligent device being a receiver from among the number of receivers, storing the set of map data in the storage of the receiver.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
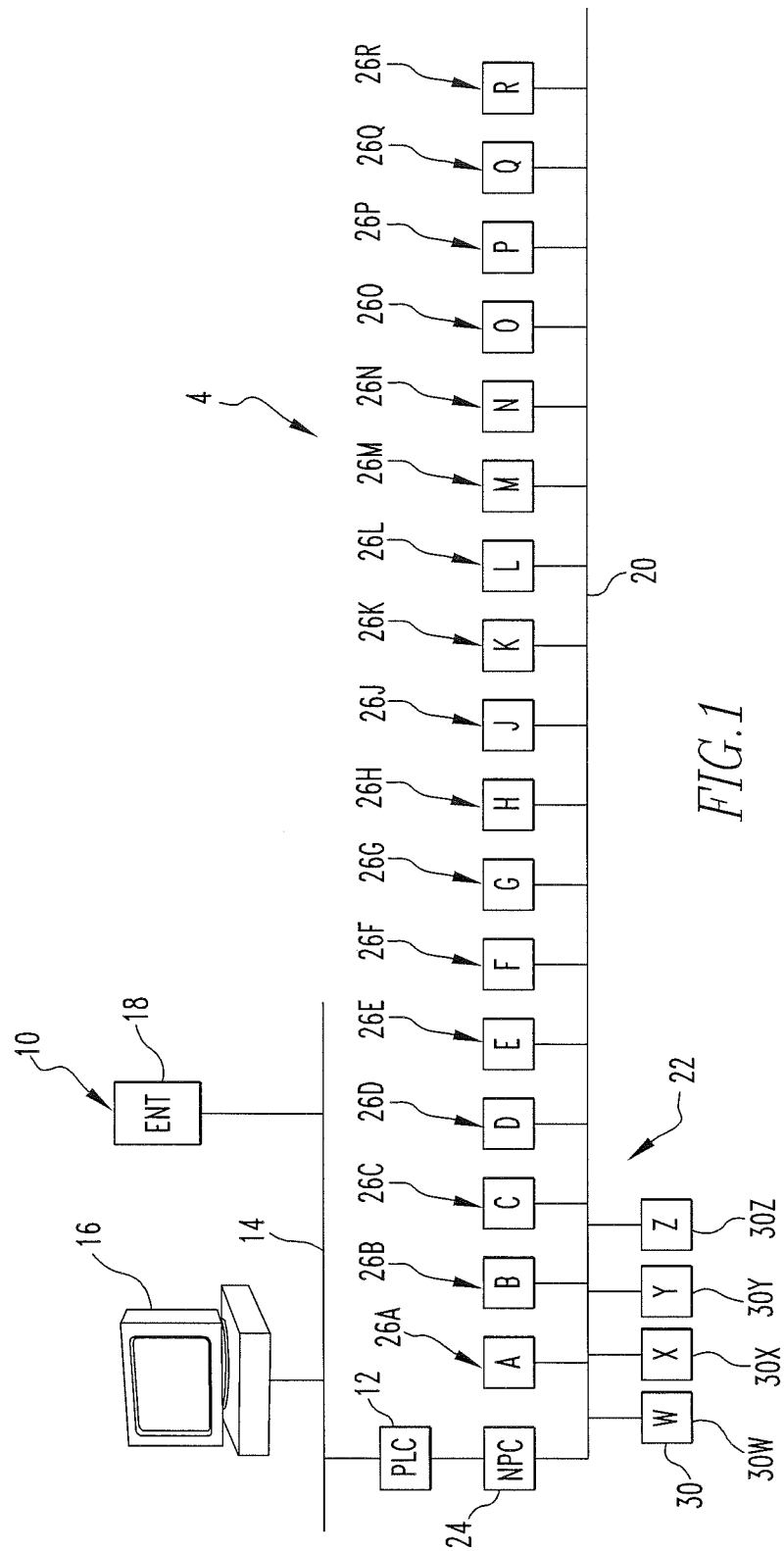
FIG. 1 is a depiction of an improved distributed logic control apparatus in accordance with the disclosed and claimed concept.
Figure 2:
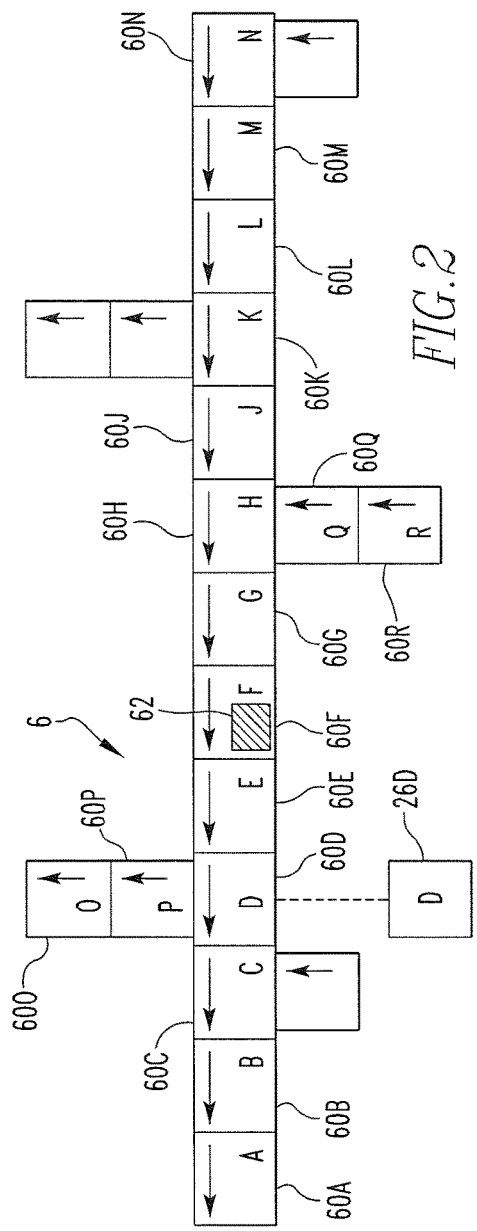
FIG. 2 is a diagrammatic depiction of a system that is controlled by the distributed logic control apparatus of FIG. 1.

An improved distributed logic control apparatus 4 in accordance with the disclosed and claimed concept is depicted generally in FIG. 1. As will be set forth in greater detail below, the control apparatus 4 is usable to provide distributed control of a system 6 that is depicted in FIG. 2 as being in the exemplary form of a unit load handling conveyor. It is understood that the control apparatus 4 is usable with other types of systems in order to provide distributed control thereof without departing from the spirit of the instant disclosure.

As can further be seen in FIG. 1, the exemplary control apparatus 4 is depicted as being connected with an enterprise data system 10 that includes a programmable logic controller (PLC) 12 that is connected with a communications network 14. The enterprise data system 10 further includes a desktop computer 16 and an enterprise mainframe computer 18 that are likewise connected with the communications network 14 and that are intended to represent a number of computing devices and other devices that are usable in any of a variety of fashions. As employed herein, the expression "a number of" and variations thereof shall refer broadly to any non-zero quantity, including a quantity of one. It is understood that in other embodiments the control apparatus 4 need not be connected with the enterprise data system 10, and it is further understood that the enterprise data system 10 is depicted in FIG. 1 merely for purposes of illustrating how the control apparatus 4 can be implemented into an overall data communication and control system within an enterprise. It is thus also understood that any one or more of the PLC 12, the desktop computer 16, and the enterprise mainframe computer 18 can be omitted from the enterprise data system 10 without departing from the spirit of the present disclosure.

As can be understood from FIG. 1, the exemplary control apparatus 4 can be said to include a data network 20 and a plurality of devices 22 that are electronically connected with the data network 20. The plurality of devices 22 are depicted herein as including a network protocol controller (NPC) 24 and plurality of intelligent devices 26A, 26B, 26C, 26D, 26E, 26F, 26G, 26H, 26J, 26K, 26L, 26M, 26N, 26O, 26P, 26Q, and 26R, which can collectively or individually referred to herein with the numeral 26. The intelligent devices 26 are all enhanced devices, meaning that they are capable of certain logic operations and other operations thereon that enable the intelligent devices 26 to provide distributed control to the system 6.

The plurality of devices 22 in the depicted exemplary embodiment also include a number of other devices 30W, 30X, 30Y, and 30Z, which may be collectively or individually referred to herein with the numeral 30, and which are not enhanced devices. That is, the other devices 30 are connected with the data network 20 and thus are capable of some level of interaction with the NPC 24 or with the enterprise data system 10, or both, but the other devices 30 are generally unaware of the enhanced intelligent devices 26 and are typically incapable of performing logic operations. On the other hand, the intelligent devices 26 are generally aware of the other devices 30, and this is the case regardless of whether or not the intelligent devices 26 interact with the other devices 30.

The NPC 24 may employ a protocol and an underlying control network such as SmartWire-DT® or other such control network that employs a summation frame-based protocol. The NPC 24 itself can be a stand-alone device or can be more in the nature of a software routine that is executed on a gateway device that is connected between the communications network 14 and the data network 20. Other examples will be apparent.

Figure 3:
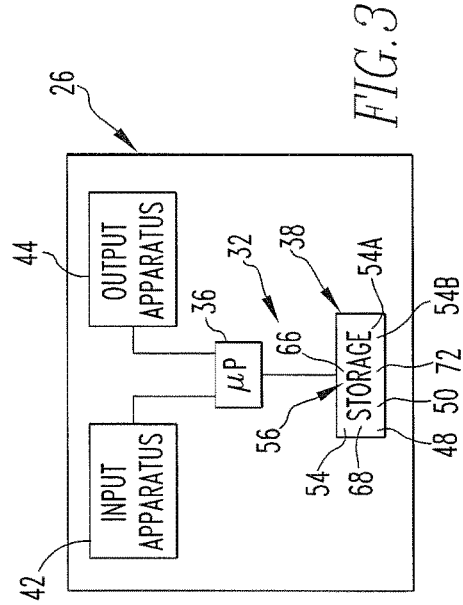
FIG. 3 is a schematic depiction of an enhanced intelligent device of the distributed logic control apparatus of FIG. 1.

An exemplary intelligent device 26 is depicted generally in FIG. 3. The intelligent device can be said to include a processor apparatus 32 that includes a processor 36 and a storage 38 that are in communication with one another. The intelligent device 26 further includes an input apparatus 42 and an output apparatus 44 that are in communication with the processor apparatus 32. The input apparatus 42 can be any of a wide variety of input devices such as signal inputs, measurement devices, and the like, and may simply be a connection with the data network 20. In a similar fashion, the output apparatus 44 can be any of a wide variety of output devices such as signal outputs, motor controllers, and the like, and may simply be the aforementioned connection with the data network 20.

The processor 36 can be any of a wide variety of processing devices, such as microprocessors, and the like without limitation. The storage 38 can be any of a wide variety of data storage devices and can include, by way of example, RAM, ROM, EPROM, FLASH, and the like without limitation. It is noted that the storage 38 in the depicted exemplary embodiment includes both a volatile storage 48 and a persistent storage 50. The storage 38 has stored therein a number of routines that include a setup routine 54A and a control routine 54B, among other routines, which can be collectively or individually referred to herein with the numeral 54. As will be set forth in greater detail below, the storage 38 additionally can have stored therein a set of map data 56 that is used for purposes that are likewise set forth in greater detail below.

As can be understood from FIG. 2, the exemplary system 6 includes a plurality of conveyor segments 60A, 60B, 60C, 60D, 60E, 60F, 60G, 60H, 60J, 60K, 60L, 60M, 60N, 60O, 60P, 60Q, and 60R, which can be collectively or individually referred to herein with the numeral 60. The conveyor segment 60A is controlled by the intelligent device 26A, the conveyor segment 60B is controlled by the intelligent device 26B, and so forth. It is understood that the system 6 will likely include many more conveyor segments 60 than are expressly depicted in FIG. 2 and are described herein, and it is likewise understood that the control apparatus 4 likely will have more intelligent devices 26 and other devices 30 than are expressly depicted in FIG. 1. It is understood, however, that the conveyor segments 60 are each advantageously separately controllable by a corresponding intelligent device 26 to comprehensively form the exemplary unit load handling conveyor that is the exemplary system 6.

The system 6 is depicted in FIG. 2 as having an object 62 carried thereon that is depicted in FIG. 2 as being situated on the conveyor segment 60H. It is understood that the system 6 is intended to simultaneously carry a large number of other objects, and the conveyor segments 60 are advantageously separately controlled in order to provide efficient transportation of the various objects throughout a facility while avoiding collisions between the objects and likewise avoiding unintended accumulation thereof on any given conveyor segment 60. For example, if one of the conveyor segments 60 was stopped for whatever reason, the other conveyor segments 60 that are situated ahead of (i.e., prior to or upstream of) the stopped conveyor segment 60 would, in the absence of information regarding the stopped conveyor segment 60, continue to transport objects toward the stopped conveyor segment 60, with the result that the stopped conveyor segment 60 might experience an unintended accumulation of objects and possible spillage, which would be undesirable. As will be set forth in greater detail below, the individual control of the conveyor segments 60 by the corresponding intelligent devices 26 advantageously avoids such accumulation, collision, and other failure in handling the objects.

As suggested above, the routines 54 advantageously include a setup routine 54A that is stored on each of the intelligent devices 26 and which is executable on the processor 36 of each such intelligent device 26 in order to automatically perform a setup operation of the control apparatus 4, such as during initial power on. As has been suggested above, any number of the intelligent devices 26 and the other devices 30 can be connected with the data network 20, and the setup routine 54 that is executable on the intelligent devices 26 is operable to perform the setup operation regardless of the number of intelligent devices 26 and other devices 30 the control apparatus 4 includes.

The core logic of the NPC 24 typically establishes some minimal level of communication between the NPC 24 and all of the various intelligent devices 26 and the other devices 30 promptly after the initial power on of the plurality of devices 22 and the data network 20. Specifically, the NPC 24 will, as at 104, send to each intelligent device 26 an address of the intelligent device 26, and will likewise send to each other device 30 an address of the other device 30. In the depicted exemplary embodiment, the NPC 24 self-assigns to itself the address of 00 and sends to each of the devices 22 in the plurality of devices 22 the addresses 01, 02, 03, etc., in order of distance of the device from the NPC 24 in terms of distance along the data network 20. In the depicted exemplary embodiment, the addresses of the devices 22 are numbered from 01 through 99, although greater numbers and/or other numbers or designations can be employed as needed without departing from the spirit of the instant disclosure. When such communication between the NPC 24 and the intelligent and other devices 26 and 30 has been established, the control apparatus 4 can be said to be in a state known as "full comms".

Processing continues, as at 108, where the setup routine 54A causes each of the intelligent devices 26 to query at least one other device among the plurality of devices 22 in order to ascertain what the at least one other device is. In order to do so, each such intelligent device 26 in the depicted exemplary embodiment starts a timer to measure the overall time required for twelve complete cyclic data frames (74, FIG. 6) to be communicated over the data network 20. This calculated period of time is a function of the size of the data frame 74 and the baud rate on the data network 20. This value is used as a multiplier value to set a delay period, after which a self-determination operation that results from operation of the setup routine 54A will be initiated on the intelligent device 26. The address (01-99) that has been assigned to the intelligent device 26 is subtracted from 100 and is multiplied by the delay period. As such, the intelligent device 26 having the numerically highest address will have the shortest delay period and vice versa. As the delay period expires on each such intelligent device 26, the querying that is performed at 108 is initiated.

In particular, the active intelligent device 26 typically queries the device that is immediately upstream (i.e., that is closer to the NPC 24, or that has a lower address number, or that is otherwise situated) by sending an inquiry signal and expecting a certain type of response. If the active intelligent device 26 receives from the other device (the queried device) a response that was expected, this indicates that the queried device is another intelligent device 26. As such, therefore, in querying such other device 26, if an active intelligent device 26 determines, as at 112, that the other device is another intelligent device 26, the querying intelligent device 26 assigns to itself a status, as at 116, of being a "receiver". Once an intelligent device 26 has determined itself to be a receiver, the intelligent device 26 awaits the reception thereon of a set of map data 56 in a fashion that will be described in greater detail below.

As the delay period on each successive intelligent device 26 expires, each successive intelligent device 26 (in the depicted exemplary embodiment) queries the next adjacent device closer to the NPC 24 to determine, as at 112, whether such device is another intelligent device 26.

If it is determined at 112, for instance, that the queried adjacent device is not another intelligent device 26, and it is determined at 120 that the queried adjacent device is not the NPC 24, such device would be ignored, as at 124, and the querying device would query, as at 108, the next sequential device on the data network 20. For example, the queried adjacent device might be one of the other devices 30 such as the adjacent other device 30Z which, when queried by the enhanced intelligent device 26C, would either send back to the querying intelligent device 26C an unexpected signal or would sends back no signal to the querying intelligent device 26C. Since the other device 30Z would be ignored, the querying intelligent device 26C would then immediately query the next adjacent device, which would be the intelligent device 26B. The querying intelligent device 26C would then determine from the returned signal from the intelligent device 26B that the next adjacent enhanced device is another intelligent device 26, whereupon the querying intelligent device 26C would assign itself the status of receiver.

This same type of situation would also occur, for instance, when the intelligent device 26B sends a querying signal to the other device 30Y. The other device 30Y would send back a response that was, say, unintelligible by the intelligent device 26B. The querying intelligent device 26B would determine, as at 112, that the other device 30Y is not another intelligent device 26 and would also determine, as at 120, that the other device 30Y is not the NPC 24. The intelligent device 26B would thus ignore, as at 124, whatever signal may have been returned from the other device 30Y in response to the querying that occurred at 108. Immediately thereafter, the intelligent device 26B would query the other device 30X with the same result. The intelligent device 26B would then query the intelligent device 26A and would determine, as at 112, that the intelligent device 26A is another intelligent device 26 and would thus assign to itself (the querying intelligent device 26B) the status of being a receiver.

Eventually, the final intelligent device 26A performs the querying that occurs at 108. After the other device 30W is ignored at 124, the intelligent device 26A will output a query that is received by the NPC 24. The intelligent device 26 determines, as at 112, that the other device is not another intelligent device 26 and would then seek to determine, as at 120, whether the other device that has just been queried is the network protocol controller, as at 120.

In the depicted exemplary embodiment, the intelligent device 26A will determine, as at 112, based upon the response received, that the queried device (which is the NPC 24 in the depicted exemplary embodiment) is not another intelligent device 26. The intelligent device 26A would then determine, as at 120, that the queried device is the NPC 24 and the intelligent device 26 would, as at 128, assign to itself the status of being a "generator". During setup, the control apparatus 4 has only a single generator, which purpose is served by a single one of the intelligent devices 26, and one or more receivers, which is the role of the other intelligent devices 26. After setup has concluded, the status of generator or receiver is generally unimportant until the point at which the setup routine 54A is re-executed in whole or in part, such as in the event of some type of failure of the control apparatus 4, a power off situation, a change in the configuration of the control apparatus 4, etc.

Once an intelligent device 26 (i.e., the intelligent device 26A in the depicted exemplary embodiment) determines that it is the generator of the control apparatus 4 during setup, the generator queries, as at 130, all of the devices of the plurality of devices 22 and builds a system map 72, which it stores in its own volatile storage 48. It is noted that the setup algorithm 54A that is stored in the storage of each intelligent device 26 is the same on each such intelligent device 26. However, different instructions are executed by the setup algorithm 54A and different operations are responsively performed by the intelligent device 26 depending upon whether the given intelligent device 26 has assigned itself the status of being a receiver or whether it has assigned itself the status of being the generator.

Figure 5:
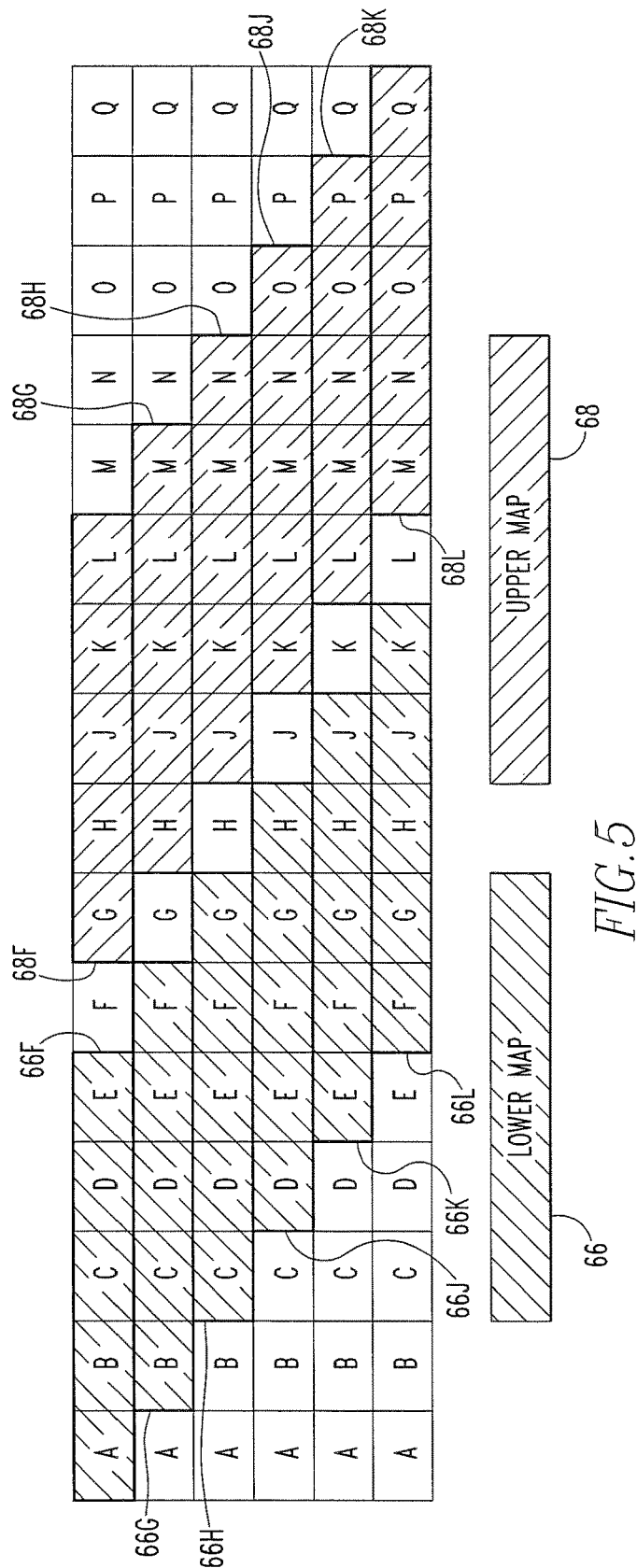
FIG. 5 is a depiction of certain portions of a set of map data that can be stored in the enhanced intelligent device of FIG. 3 and which facilitates cross-signaling among a plurality of such enhanced intelligent devices.

After the generator creates the system map 72, the generator creates for each of the intelligent devices 26 a unique lower map 66 and a unique upper map 68, such as are depicted generally in FIG. 5. More specifically, FIG. 5 depicts six exemplary lower maps 66F, 66G, 66H, 66J, 66K, 66L which, as suggested above, can be collectively or individually referred to herein with the numeral 66. Likewise, FIG. 5 depicts 6 exemplary upper maps that are indicated at the numerals 68F, 68G, 68H, 68J, 68K, 68L, which can be collectively or individually referred to herein with the numeral 68. Other lower and upper maps 66 and 68 that are created by the generator are not expressly depicted in FIG. 5 for reasons of simplicity of disclosure.

Whereas the system map 72 is generally the same for all of the intelligent devices 26, the lower map 66 and the upper map 68 for each of the intelligent devices 26 is unique to the particular intelligent device 26. This is because the lower and upper maps 66 and 68 each include data that is representative of a subset of the devices from among the plurality of devices 22 that are within a certain proximity of the particular intelligent device 26 for which the particular lower and upper maps 66 and 68 are created.

For example, the lower map 66F that is created for the intelligent device 26F includes data that is representative of and that pertains to the five peer intelligent devices 26 that are immediately upstream of the intelligent device 26F (i.e., in a direction from the intelligent device 26F toward the NPC 24, or are otherwise situated in proximity to the intelligent device 26F), which would include the intelligent devices 26A, 26B, 26C, 26D, and 26E. Likewise, the upper map 68F that is created for the intelligent device 26F includes data that is representative of and that pertains to the five peer intelligent devices 26 that are immediately downstream of the intelligent device 26F (i.e., in a direction from the intelligent device 26F and away from the NPC 24, or are otherwise situated in proximity to the intelligent device 26F), which would include the five intelligent devices 26G, 26H, 26J, 26K, and 26L. The predetermined upstream and downstream proximity of five peer devices is selected based upon the control environment and can be a number greater or lesser than five devices without departing from the spirit of the present disclosure. Likewise, the predetermined upstream and downstream proximities may be asymmetric, meaning that the lower and upper maps 66 and 68 could each have a different number of devices than the other without departing from the spirit of the present disclosure. Also, such peer intelligent devices 26 need not be strictly upstream or downstream from the perspective of the direction of flow of the conveyor segments 60 and the system 6 as a whole. Rather, the peer intelligent devices 26 are within a predetermined proximity of a given intelligent device 26, and may be situated other than strictly upstream or downstream from the perspective of the direction of flow of the conveyor segments 60 (i.e., laterally situated, or situated above or below, etc., depending upon the configuration of the relevant system with which the control apparatus is being used) without departing from the spirit of the instant disclosure.

It is understood that each of the lower and upper maps 66 and 68 is unique from every other lower and upper map 66 and 68, and that each such lower map and upper 66 and 68 is tailored to each particular intelligent device 26. Furthermore, it can be understood that certain of the intelligent devices 26 will have fewer than five other peer intelligent devices 26 represented in its lower or upper maps 66 or 68. For example, the intelligent device 26A may have no lower map 66 at all, or may include a lower map 66 that is empty of any data. The intelligent device 26C would have in its lower map 66 data that pertains only to the two upstream peer intelligent devices 26A and 26B.

As will be set forth in greater detail below, the control apparatus 44 employs a protocol wherein a data frame 74 is communicated regularly along the data network 20. As can be understood from FIG. 6, the data frame 74 can be said to begin with a header 78 that is followed by a first data stream 80, a second data stream 84, and a frame check sequence (FCS) 86. The NPC 24 creates and transmits the header 74 and the first data stream 80 along the data network 20. The intelligent devices 26 and, potentially, one or more of the other devices 30, sequentially and collectively generate and communicate signals to the data network 20 that together form the second data stream 84. The NPC 24 then creates and transmits the FCS 86 on the data network 20. Since each of the intelligent devices 26 and each of the other devices 30 is connected with the data network 20, each of the intelligent devices 26 and each of the other devices 30 is receiving the header and the first data stream 80 as they are communicated along the data network 20. Each of the intelligent devices 26 and each of the other devices 30 is also receiving the second data stream 84 as it is transmitted on the data network 20 except for the moments when each particular intelligent device 26 and, potentially, one or more of the other devices 30, outputs its signal to the data network 20 at the appropriate time. Each of the intelligent devices 26 and each of the other devices 30 additionally receives the FCS 86 and performs a data checking operation to confirm, based upon the FCS 86, whether the data frame 74 as detected at each intelligent device 26 and at each other device 30 is considered to be "valid". For instance, the FCS 86 can be used to perform a parity check or other check of the data. If any such intelligent device 26 or other device 30 determines the data frame 74 to be invalid, the intelligent device 26 or other device 30 ignores any data that it may have received from such invalid data frame 74. On the other hand, if the intelligent device 26 determines that the data frame 74 was valid, the intelligent device 26 performs whatever operations are dictated by the control routine 54B that is being executed thereon, as will be set forth in greater detail below, and which occurs after the completion of the setup operation. Likewise, if the other devices 30 determine that the data frame 74 was valid, the other devices 30 perform whatever operations are dictated by their programming.

The system map 72 that is stored in all of the intelligent devices 26 may be relatively simplistic and may include, for instance, merely the offset of each intelligent device 26 from the beginning of the data frame 74, by way of example. The system map 72, by way of example, might additionally include an identity for each intelligent device 26 or other information that may be relevant to the plurality of devices 22. Furthermore, it is noted that the system map 72 that is stored in all of the intelligent devices 26 may actually be a shorthand version of the system map 72 that is stored at the NPC 24 or may be a subset thereof that might omit, for instance, one or more of the other devices 30.

The lower and upper maps 66 and 68 typically include more information regarding the various other intelligent devices 26 that are within the predetermined proximity and may include, for instance, the network address of the intelligent device, a device number of the intelligent device (for instance if each of the devices is given some type of a sequential or other number or designation), the offset of the intelligent device from the beginning of the data frame 74, a model number of the intelligent device 26, and a configuration profile of the intelligent device. The offset, which is also mentioned above, may refer to the number of bytes (or bits or words, etc.) from the beginning of the data frame 74 at which a given peer intelligent device 26 will transmit its signal as part of the second data stream 84. The configuration profile of a given peer intelligent device 26 might include a definition of the format in which data from the peer device will be communicated to the data network 20 when it transmits its signal as part of the second data stream 84, i.e., the continuation profile can define whether the data is generated or consumed in bits or bytes or words, by way of example, the length of its signal, and other relevant data. The lower and upper maps 66 and 68 typically include all such information and potentially other information regarding the peer intelligent devices 26 that are within the predetermined proximity upstream and downstream, respectively, of the particular intelligent device 26 for which the particular corresponding lower and upper maps 66 and 68 were generated.

Figure 4:
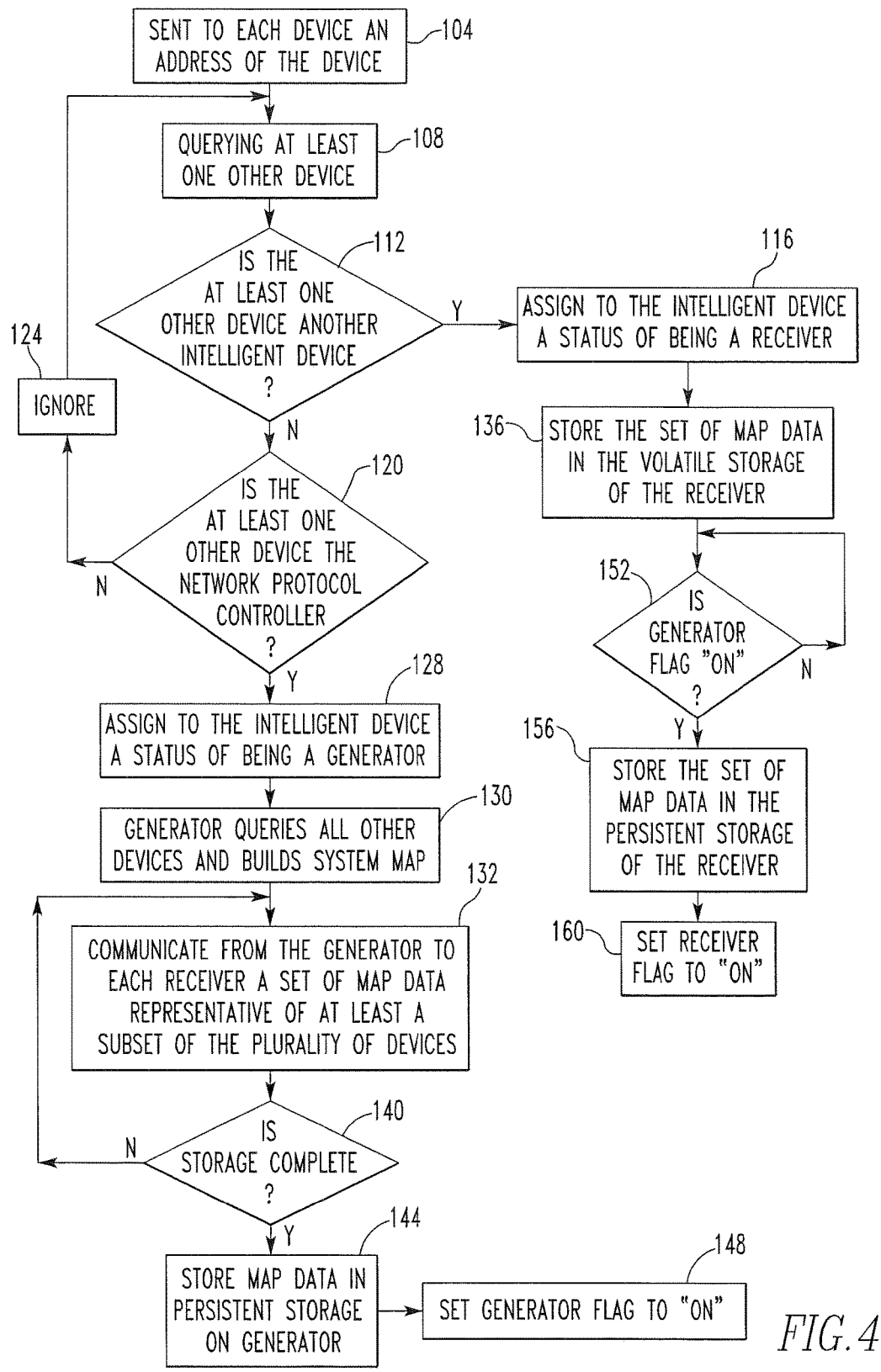
FIG. 4 is an exemplary flowchart depicting certain aspects of an improved method in accordance with the disclosed and claimed concept that is performed by the distributed logic control apparatus of FIG. 1.

With reference again to FIG. 4, processing continues, as at 132, where the set of map data 56, which includes the lower and upper maps 66 and 68 and a system map 72, is communicated to each intelligent device 26. Each such intelligent device 26 then stores, as at 136, the set of map data 56 in its volatile storage 48. The generator intelligent device 26 continues to generate and communicate such sets of map data 56 to the various intelligent devices 26 until the generator intelligent device 26 determines, as at 140, that the storage of the sets of map data 56 in all of the intelligent devices 26 has been completed. Responsive to such a determination, as at 140, processing will continue, as at 144, where the generator will store its map data in the persistent storage 50 on the generator. The generator will then, as at 140, set a generator flag to "ON". Responsive to each receiver intelligent device 26 detecting that the generator flag is "ON", each receiver intelligent device 26 will then store, as at 156, its set of map data 56 in its persistent storage 50. Optionally, the receiver intelligent devices 26 may additionally set a receiver flag on the receiver intelligent device 26 to an "ON" state, as at 160. The receiver flag being set to an "ON" state is usable for diagnostic purposes and for other purposes. Once the map data 56 has been stored, as at 144 and at 156, in the persistent storage 50 of each intelligent device 26, the setup routine 54A is terminated, and the control routine 54B is initiated on each of the intelligent devices 26.

As suggested above, whether a given intelligent device 26 assigns to itself the status of a receiver or of the generator generally is no longer relevant once the setup routine 54A has terminated and the control routine 54B has been initiated. It is noted, however, that in the event of certain situations, such as an error situation on the control apparatus 4 or a change in the configuration of the control apparatus 4, the setup routine 54A may be reinitiated in order to confirm that the configuration of the control apparatus 4 is unchanged. For example, if communications on the data network 20 drop from full comms to a fail-safe condition, a restoration of communications on the data network 20 from the fail-safe condition back to full comms will trigger a resetting and rebuilding of all of the aforementioned map data 56. This happens for example when a field bus connection to a gateway is lost, and in other situations. If the configuration of the control apparatus 4 is determined to have been changed, the setup routine 54A will re-execute some or all of the aforementioned steps in order to ensure that the set of map data 56 that is stored in all of the intelligent devices 26 is complete and accurate.

It can be seen that the setup routine 54A is advantageously configured to enable each of the intelligent devices 26 to cooperate with the other intelligent devices 26 in order to automatically cause the set of map data 56 to be stored in the persistent storage 50 on the intelligent device 26. This saves considerable effort in manual programming and setup, and such savings is highly desirable.

The execution of the control routine 54B typically commences with the next data frame 74 after the generator flag has been set to "ON", as at 148, and the set of map data 56 has been stored, as at 156, in the persistent storage 50 of all of the intelligent devices 26. In such a situation, and as suggested above, the NPC 24 generates and transmits to the data network 20 the header 74 and the first data stream 80. At the end of the first data stream 80, the various intelligent devices 26, at a time determined by the system map 72, each generate a signal and output the signal to the data network 20, with the signals from the various intelligent devices 26 together forming the second data stream 84. Depending upon the nature of the other devices 30, the other devices 30 can likewise generate a signal and output the signal to the data network 20 as part of the second data stream 84. Each intelligent device 26 receives the data frame 74 except during the time when the intelligent device 26 is communicating its own signal to the data network 20 that forms a respective portion of the second data stream 84. Depending upon the nature of the other devices 30, the other devices 30 can likewise receive the data frame 74 and, if the other devices 30 are capable of generating and outputting a signal that forms a part of the second data stream 84, the other devices 30 will be listening except during the time when the other device 30 is communicating its own signal to the data network 20 that forms a respective portion of the second data stream 84. Advantageously, therefore, each intelligent device 26 is detecting the signals that are being transmitted by its peer intelligent devices 26 that are within the predetermined proximity upstream and downstream of the given intelligent device 26 and is potentially also detecting the signals that are being transmitted by its peer other devices 30 that are within the predetermined proximity or are otherwise situated.

In the depicted exemplary embodiment, each intelligent device 26 actually receives the signals in the second data stream 84 that are transmitted by all of the other intelligent devices 26, but each such intelligent device 26 generally ignores all such signals except for those that have been pre-established in the lower and upper maps 66 and 68 as being peer intelligent devices which, in the depicted exemplary embodiment, include at most the five upstream intelligent devices and the five downstream intelligent devices 26, to the extent that such devices exist.

Advantageously, therefore, and as can be understood from FIG. 5, each intelligent device 26 is paying attention to its ten (at most, in the depicted exemplary embodiment) peer devices, and such paying of attention occurs in a blanketed or simultaneous fashion. For instance, and as can be seen in FIG. 5, the intelligent device 26F is receiving and paying attention to the signals from its upstream (or otherwise situated within a predetermined proximity) peer intelligent devices 26A, 26B, 26C, 26D, and 26E as the signals are transmitted by such intelligent devices 26 to the data network 20. Likewise, the intelligent device 26F is paying attention to the signals that are being transmitted by the downstream (or otherwise situated within a predetermined proximity) peer intelligent devices 26G, 26H, 26J, 26K, and 26L as those signals are generated and transmitted on the data network 20 by such intelligent devices 26. Simultaneously therewith, the intelligent device 26G is listening to the signals from its five upstream and five downstream (or otherwise situated within a predetermined proximity) peer intelligent devices 26B, 26C, 26D, 26E, 26F, 26H, 26J, 26K, 26L, and 26M as their respective signals are generated and communicated on the data network 20. It thus can be seen, for example, that when a given intelligent device 26 generates and transmits its signal on the data network 20, the five peer intelligent devices 26 that are upstream thereof (or are otherwise situated within a predetermined proximity) and the five peer devices 26 that are downstream thereof (or are otherwise situated within a predetermined proximity) are simultaneously listening and paying attention to such signal as it is being transmitted on the data network 20.

Advantageously, therefore, the control routine 54B includes instructions for the intelligent device 26 to take action depending upon whether the signal that is generated by any of its pre-established peer intelligent devices 26 indicates a need for some action. For example, the intelligent device 26D may determine that the signals from its five downstream peer intelligent devices 26 and its number of upstream peer intelligent devices 26 indicate that processing is continuing as normal and that no change should be made to its operation. On the other hand, the sequential signals from the five downstream intelligent devices 26 might indicate that the object 62 is sequentially passing the intelligent devices 26K, 26J, 26H, 26G, and 26F, in which case the control routine 54B would make apparent to the intelligent device 26D that the object 62 is imminently approaching the intelligent device 26D. This might indicate the need for the intelligent device 26D to initiate its motor to turn on its conveyor segment 60D in order to cause the object 62 to be conveyed along it. The control routine 54B thus has instructions which, when executed on the intelligent device 26D in response to an appropriate signal being detected by the intelligent device 26D, cause the intelligent device 26D to perform such appropriate responsive action. It is noted that FIG. 2 expressly depicts the conveyor segment 60D being operatively controlled by the intelligent device 26D, and it is understood that the other conveyor segments 60 are likewise controlled by the other corresponding intelligent devices 26, although this is not expressly depicted in FIG. 2 for reasons of clarity of disclosure.

On the other hand, other data from the intelligent devices 26 that are peers to any other intelligent device 26 may result, based upon the instructions in the control routine 54, to cause the particular intelligent device 26 to take other action. For instance, the conveyor segments 60D and 60K in the depicted exemplary embodiment additionally include a kicker device that is intended to change the course of the object 62. For instance, the kicker device on the conveyor segment 60D might be instructed to be energized by the intelligent device 26D in order to cause the object 62 to be pushed onto the conveyor segment 60P. In such a case, the intelligent device 26P will already know to initiate the motor on the conveyor segment 60P. This is because the intelligent device 26D will already be a peer intelligent device 26 in the upper map 68 stored in the storage 38 of the intelligent device 26P. As such, the intelligent device 26D will have communicated as part of its signal to the data network 20 information representative of the fact that the kicker on the conveyor segment 60D was being energized, and this signal would have been detected by the intelligent device 26P and be acted upon as coming from one of its pre-established peer intelligent devices 26. Such actions will result in the object 62 being pushed onto the conveyor segment 60P and the conveyor segment having its motor energized (as appropriate) to move the object 62 toward the conveyor segment 60O, by way of example.

It thus can be understood that the various instructions contained in the control routine 54B instruct the intelligent device 26 on which the control routine 54B is being executed to take certain actions depending upon the signals that are detected from the second data stream 84 from its peer intelligent devices 26. Such communication between one intelligent device 26 and another intelligent device 26 can be referred to as "implicit" cross-signaling since the signal that was output by a given intelligent device 26 was detected by one or more peer intelligent devices 26 without necessarily being directed thereto, and such signal may have been acted upon by any number of intelligent devices 26 depending upon the programming and instructions that were contained in the control routine 54B. Such cross-signaling can be referred to as "implicit" inasmuch as the signal that was output by one intelligent device 26 and that was received and acted upon by another intelligent device 26 was based upon the control routine 54B that was being executed on the intelligent device 26 that detected, i.e., received, the signal and whose instructions chose to act upon the received signal regardless of whether the intelligent device 26 that generated the signal was expecting any action by its peer intelligent devices 26.

The control routine 54B additionally permits "explicit" cross-signaling to occur based upon pre-established explicit data definitions. For example, and as can be understood from FIG. 6, the exemplary data frame 74 includes a series of bytes that are communicated on the data network 20. The header 74 includes four bytes, and each of the intelligent devices 26A through 26R has one byte in the first data stream 80 dedicated to it and which is transmitted on the data network 20 by the NPC 24. These bytes, which are numbered "Byte 04" through "Byte 20" are each a single byte of data that the NPC 24 can use to provide an instruction for each intelligent device 26. The byte of data that is dedicated to any given intelligent device 26 can be received by such intelligent device 26 or can alternatively be received by one or more other intelligent devices 26, depending upon the instructions in the control routine 54B.

Figure 6:
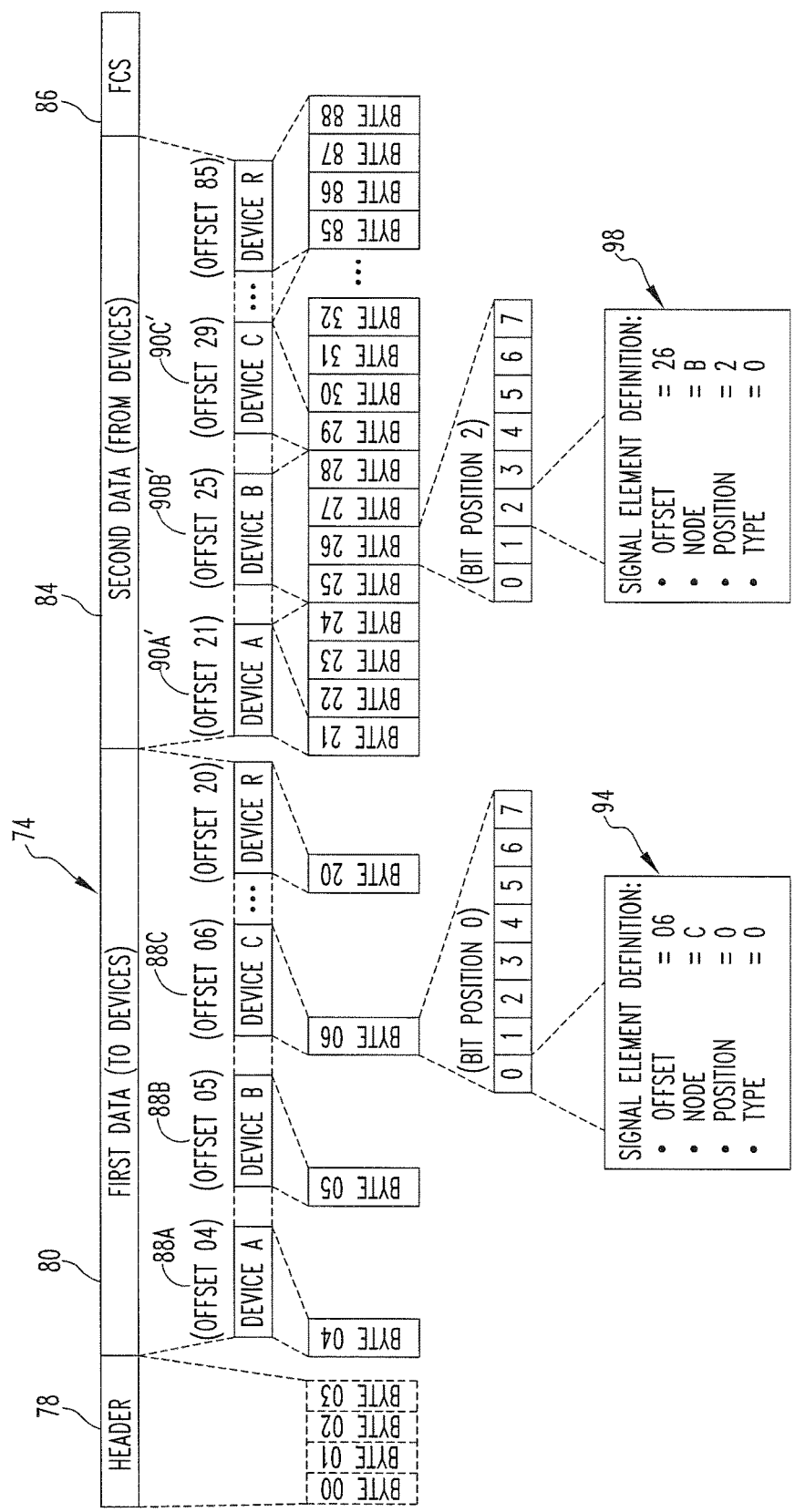
FIG. 6 is a diagrammatic depiction of a data frame that is communicated on the distributed logic control apparatus and which enables cross-signaling and direct signaling among a plurality of devices of the distributed logic control apparatus of FIG. 1.

Furthermore, FIG. 6 demonstrates that each of the intelligent devices 26 transmits as its signal four bytes of data to the data network 4, and the four bytes from each of the intelligent devices 26 sequentially and together form the second data stream 84. It is reiterated that the other devices 30 can likewise output a signal that forms a part of the second data stream 84. Each signal component in the first data stream 80 that is dedicated to one of the intelligent devices 26, and every signal component that originates from one of the intelligent devices 26 or one of the other devices 30 in the second data stream 84, is identifiable via coordinates in terms of an offset from the beginning of the header 78. For instance, FIG. 6 indicates that an offset 88A of four bytes from the beginning of the header 78 is where the beginning of the byte (Byte 04) that is dedicated to intelligent device 26A is transmitted within the data frame 74. Likewise, an offset 88B of five bytes is where the byte (Byte 05) that is dedicated to the intelligent device 26B begins in the data frame 74 with respect to the beginning of the header 78. Another offset 88C indicates that the data byte (Byte 06) that is dedicated to the intelligent device 26C begins six bytes from the beginning of the header 78.

In a similar fashion, another offset 90A' has an offset of twenty-one bytes from the beginning of the header 78 and is beginning point of the signal that is generated by the intelligent device 26A and that is communicated to the data network 20 as part of the second data stream 84. It is reiterated that in the exemplary embodiment described herein, each signal from each intelligent device 26 is four bytes in length. As such, another offset 90B' begins at Byte 25 and thus has an offset of twenty-five bytes from the beginning of the header 78, and another offset 90C', which is the beginning of the signal that is generated by the intelligent device 26C, begins at an offset of twenty-nine bytes from the beginning of the header 78.

The offset data and other data that is included in the system map 72 can, if desired, be used to establish one or more explicit data definitions, and such explicit data definitions are usable to provide explicit signaling between the plurality of devices 22. Such explicit data definitions can take the form of a specific data location within the data frame 74 that is pre-defined as being the repository for data that is explicitly communicated from one device 22 to another device 22.

For example, an explicit data definition 94 defines an offset "06" of six bytes, a node "C" of intelligent device 26C, a position "0", and a type "0" (wherein Type=0 refers to bits versus bytes or words, etc., of the position). That is, the explicit data definition 94 dedicates a particular bit (inasmuch as type=0) situated at the position 0 within the byte that is dedicated to the intelligent device 26C and which has an offset of six bytes from the beginning of the data frame 74. This particular bit is explicitly defined by the explicit data definition 94 as being the place to look for a specific instruction, i.e., an instruction from the network protocol controller 24. As such, in the exemplary embodiment depicted herein, the control routine 54B would include an instruction that when the bit 0 in the byte beginning at an offset of six bytes from the beginning of the header 78 has a certain value, the intelligent device 26 on which the control routine 54 is being executed will cause the intelligent device 26 to take some predetermined action responsive thereto. If the type had been equal to 1, for instance, this might refer to the entire byte of data, meaning that the entire byte of data beginning at the indicated offset was to be consumed. The same can occur of type had been equal to 2, which would indicate that then entire word beginning at the indicated offset would be consumed. Other examples will be apparent.

Another explicit data definition 98 is depicted as being defined as a part of the second data stream 84 and specifies an offset of twenty-six bytes, which is from node "B" (which refers to the signal output by intelligent device 26B) and specifically the bit (type=0) that is at second position (position=2) in byte 26. As such, the instructions in the control routine 54B that is being executed on a particular intelligent device 26 may cause the intelligent device 26 to take some predetermined action if the second bit in byte 26 has a certain value (high or low), by way of example.

Such cross-signaling is said to be "explicit" inasmuch as it is based upon a specific instruction, such as in the control routine 54B, to perform some type of predetermined action based upon a particular portion of the data frame 74 having a predetermined value. It is understood that type could refer to a bit, a byte, a word, etc., and that the position, node, and offset can likewise be different than that expressly shown in FIG. 6 and set forth above without departing from the spirit of the described concepts. As such, it can be seen that the routines 54, and specifically the control routine 54B, can include pre-defined explicit data definitions that instruct the intelligent devices 26, for instance, to look for specific data values at specific locations in the data frame 74 and to cause the particular intelligent device 26 that is executing the routine 54 to take some pre-defined action. Other examples will be apparent.

It thus can be seen that the set of map data 56 and the control routine 54B that are stored in the storage 38 of each of the intelligent devices 26 enable both implicit and explicit cross-signaling to occur and for the logic components of the intelligent devices 26 to responsively take action depending upon the nature of the data in the data frame 74 and the programming in the control routine 54B. By distributing control to the various intelligent devices 26, there is no need for PLC 12 to manage all of the control of the control apparatus 4, and rather PLC 12 is not considered to be a part of the control apparatus 4 and rather is an optional portion of the enterprise data system 10. That is, the control apparatus 4 in the depicted exemplary embodiment is in control of the system 6 by virtue of logical operations being executed on the intelligent devices 26 as maybe managed from time to time by the NPC 24. The distributed logic that is afforded by the intelligent devices 26 by virtue of the implicit and explicit cross-signaling noted above enables rapid responses by each of the intelligent devices 26 in response to signals that are generated by peer intelligent devices 26 and the NPC 24, which avoids undesired actions occurring in the system 6. It also avoids the need to have a robust single controller controlling all of the operations of the control apparatus 4, which can reduce cost. Furthermore, the distributed logic afforded by the control apparatus 4 avoids a single point of failure in the control apparatus 4, which is advantageously avoided.

As suggested above, if any given intelligent device 26 experiences a problem, the intelligent devices 26 upstream and downstream thereof can take appropriate action based upon the signals that are implicitly received by the peer intelligent devices 26 thereto based upon the signals that are generated and communicated to the data network 20 by the intelligent device 26 that is experiencing the problem. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A distributed logic control apparatus usable to control a system and comprising:
   a data network;
   a plurality of devices connected with the data network;
   the plurality of devices comprising a network protocol controller and a plurality of intelligent devices;
   the network protocol controller being structured to output to the data network a header of a data frame;
   each intelligent device of the plurality of intelligent devices comprising a processor apparatus, the processor apparatus comprising a processor and a storage, the storage having stored therein a number of algorithms that are executable on the processor to cause the corresponding intelligent device to perform a number of operations;
   the plurality of intelligent devices each being structured to separately output a signal to the data network wherein the signals together form a data set of the data frame; and
   each intelligent device of the plurality of intelligent devices being structured to detect at least a portion of the data set, at least a first intelligent device of the plurality of intelligent devices being structured to perform an operation of the number of operations responsive to the detecting of the at least portion of the data set.

2. The distributed logic control apparatus of claim 1 wherein at least some of the intelligent devices of the plurality of intelligent devices each has a set of map data stored in its storage, the set of map data comprising:
   a first set of map data that is representative of a subset of the plurality of intelligent devices that are within a predetermined physical proximity of the intelligent device; and
   a second set of map data that is representative of another subset of the plurality of intelligent devices that are within another predetermined physical proximity of the intelligent device.

3. The distributed logic control apparatus of claim 2 wherein:
   the first set of map data comprises, for each intelligent device of the subset, a coordinate value that is representative of an offset from a location in the data frame at which the corresponding signal that is output by the intelligent device begins; and
   the second set of map data comprises, for each intelligent device of the another subset, another coordinate value that is representative of another offset from a location in the data frame at which the corresponding signal that is output by the intelligent device begins.

4. The distributed logic control apparatus of claim 3 wherein the operations comprise:
   employing each coordinate value and each another coordinate value to detect the corresponding signal that is output in the data set by each intelligent device of the subset and each intelligent device of the another subset; and
   responsive to at least one corresponding signal being a predetermined signal, causing the intelligent device to take a predetermined action.

5. The distributed logic control apparatus of claim 4 wherein the set of map data further comprises a third set of map data that is representative of the plurality of devices, the third set of map data comprising, for at least a first intelligent device of the plurality of intelligent devices, a coordinate value that is representative of a further offset from a location in the data frame at which the corresponding signal that is output by the at least first intelligent device begins, and wherein the operations further comprise employing the further offset to detect the corresponding signal that is output by the at least first intelligent device and, responsive to the corresponding signal being another predetermined signal, causing the intelligent device to take another predetermined action.

* * * * *